United States Patent Office 3,200,517
Patented Aug. 17, 1965

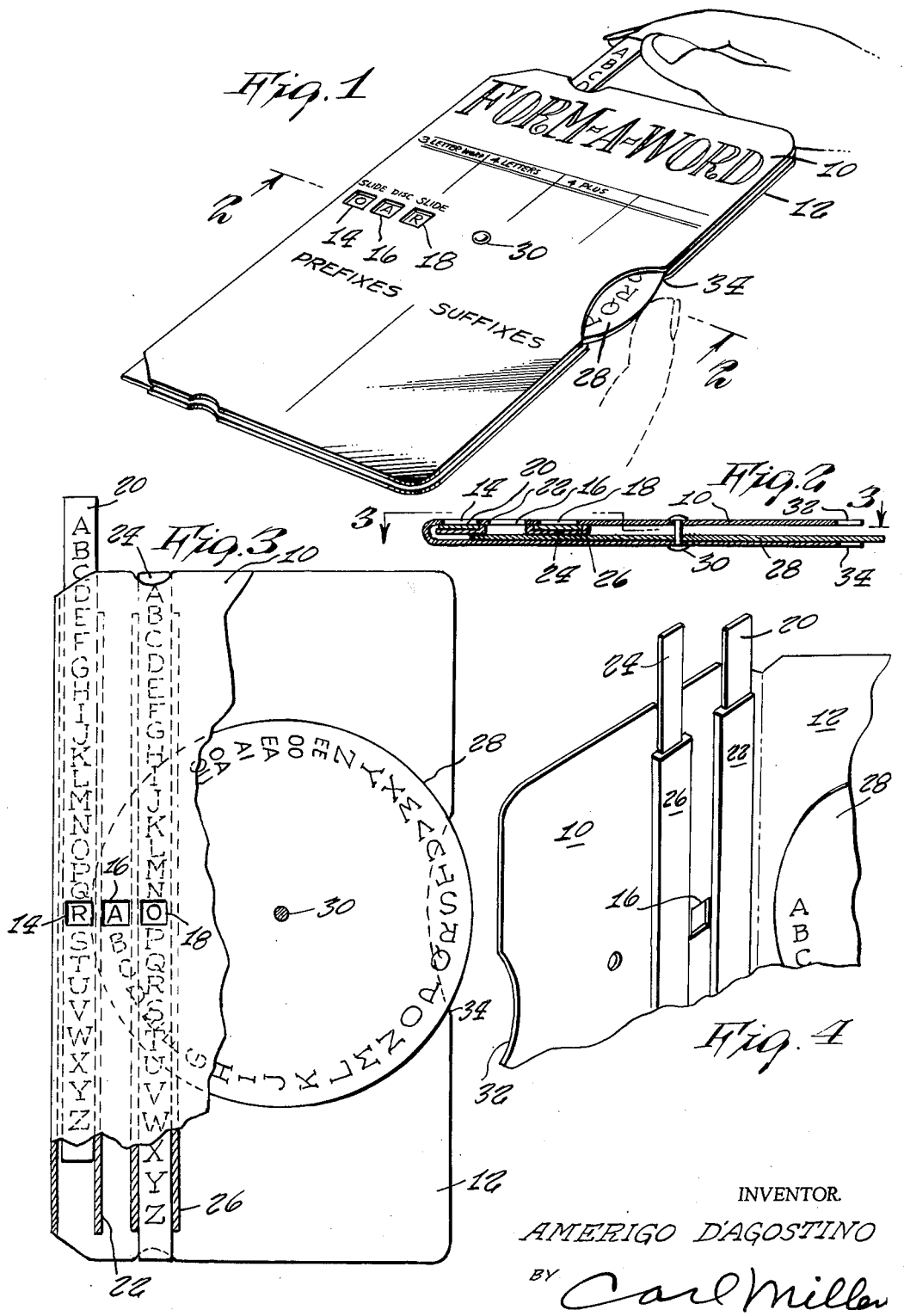

3,200,517
WORD FORMING DEVICE
Amerigo D'Agostino, 1060 Broad St., Newark, N.J.
Filed Nov. 30, 1962, Ser. No. 241,352
1 Claim. (Cl. 35—35)

My invention is directed toward educational devices.

It is an object of my invention to provide a new type of educational device which can be played as a game, wherein several letters of a word can be selected, and one letter is left blank, to be filled in by selecting letters from a rotatable wheel.

Another object is to provide a new and improved device of the character indicated, which I call a Form-A-Word.

Still another object is to provide a new and improved device of the character indicated, which can be manufactured easily and inexpensively.

All of the foregoing and still further objects and advantages of my invention will now be explained with reference both to this specification and to the drawings wherein:

FIGURE 1 is a perspective view of my invention;

FIGURE 2 is a cross-sectional view along 2—2 in FIGURE 1;

FIGURE 3 is a partially cutaway front view of my invention; and

FIGURE 4 is a developed (opened) view of certain elements of my invention.

Referring now to the drawings, there is shown a piece of cardboard folded upon itself to have a front sheet 10 and a rear sheet 12. The front sheet contains three spaced apart horizontally aligned windows 14, 16 and 18. A first vertical slide member 20 is held in vertical position by a vertical L-shaped slide guide 22, having a short leg and a long leg and secured along the edge of the short leg to the back of the front sheet 10, with the long leg directly beneath the window 14 and parallel to the front sheet 10, and with the free edge thereof closely adjacent the fold or bight edge of sheets 10, 12, see FIGURE 2. The slide member 22 carries the letters of the alphabet vertically positioned, one on top of the other, whereby sliding member 20 up or down, will cause one or another of the letters to be positioned in window 14 as for example, the letter O in FIGURE 1.

A second like slide member 24, is held in position beneath window 18 by a channel shaped slide guide 26 having the free edges of its legs secured to the back of sheet 10. The slide member 24 can be moved up and down, whereby one or another of the letters will be positioned in window 18, as for example, the letter R in FIGURE 1.

As shown in FIGURES 2 and 3, a rotatable disc 28 is seated on the inside face of sheet 12 and is pinned for example, by rivet 30 between the front and rear sheets 10 and 12. A portion of the disc 28 extends beneath both of the slide guides 22, 26, such as to be in engagement with the back surfaces thereof as well as with the inside surface of rear sheet 12. This disc carries letters of the alphabet as well as certain two letter vowel combinations spaced along the periphery thereof, whereby one or another of the letters or vowel combinations can be positioned in window 16, as for example, the letter A in FIGURE 1. Disc 28 is rotated by placing a finger on that portion of the disc exposed by cutaway portions 32 and 34 in sheets 10 and 12, respectively.

Viewing FIGURES 2 and 4, it will be seen that the slide members 20, 24 fit closely in their respective guides 22, 26, and also engage the back surface of front sheet 10, and therefore, have a slight frictional sliding engagement therebetween. Similarly, there is a slight frictional sliding engagement of the disc 28 with the backs of the guides 22, 26 and the inside surface of the rear sheet 12. Thus, the two slide members can be adjusted to select any letters as the first and last letter in a three-letter word, and various word combinations can be made by rotating disc 28.

Four-letter words, or even longer words, can be formed in this manner by adding additional slide members and guides as necessary.

Where prefixes and suffixes are to be used in conjunction with the words to be formed, these suffixes and prefixes can be written down on the front sheet in the space provided.

While I have described my invention with particular reference to the drawings, my protection is to be limited only by the terms of the claim which follows:

Having thus described my invention, what I claim as new and desire to secure by Letters Patent is:

An educational device comprising front and rear relatively stiff rectangular sheet members of equal dimensions joined together along the entire length of one of the longer sides thereof, whereby to be retained in superposed relation, at least three window openings in said front sheet member arranged in a transverse row adjacent the joined side of said sheet members and substantially centrally of the length thereof; an L-shaped in cross-section rectilinear guide element having a short leg and a long leg, secured along the free terminal edge of the short leg to the back of the front sheet member in line with the window opening nearest the joined side of said sheets and with the terminal edge of the long leg adjacent said joined side of said sheets, a rectilinear guide element U-shaped in cross-section having upstanding parallel legs equal in height to the short leg of said L-shaped guide element and a flat uninterrupted bottom secured along the free terminal edges of its legs to the back of said front sheet and in line with the window opening furthest removed from said joined side of said sheets and parallel to said L-shaped guide element, both said guide elements being of equal length with their terminal ends equally spaced from the shorter sides of said sheets, a slide member positioned in each guide element for frictional sliding movement therein with each slide member being provided with a row of characters thereon to be successively brought into view at its associated window opening, said slide members being each of a length corresponding to the length of said sheet members; a disc between said front and rear sheets, a pivot pin extending through said sheets and disc for retaining said disc for rotative movement relative thereto, said disc lying on the inside surface of said rear sheet and having a portion thereof disposed between both said guide elements substantially centrally of the length thereof and said inside suface of said rear sheet, whereby to be engaged on both sides thereof to provide for frictional sliding movement therebetween, there being a circular row of characters on said disc adjacent the periphery thereof, to be successively brought into view at the window opening between said slide element window openings, said longer other sides of said front and rear sheets being formed with registering cut-out portions centrally thereof to facilitate manipulation of the disc exposed thereby to rotate the same, the opposed corners at the joined side of said sheets being each beveled to expose an end portion of the slide member in said L-shaped guide element to facilitate finger manipulation thereof, and registering cut-out portions in the shorter sides of said sheets opposite the terminal ends of said U-shaped guide member to facilitate finger manipulation of the slide member therein.

References Cited by the Examiner
UNITED STATES PATENTS

| 1,285,038 | 11/18 | Chance | 35—74 |
| 1,859,750 | 5/32 | Pratt | 116—135 |
| 2,792,993 | 5/57 | Schramm | 35—31.1 X |

FOREIGN PATENTS 136,289   12/19   Great Britain.

EUGENE R. CAPOZIO, *Primary Examiner.*
GEORGE NINAS, JR., JEROME SCHNALL,
*Examiners.*